Sept. 20, 1960  E. ZIELER  2,953,702
IONISATION CHAMBER FOR RADIATION MEASUREMENTS
Filed Dec. 1, 1955
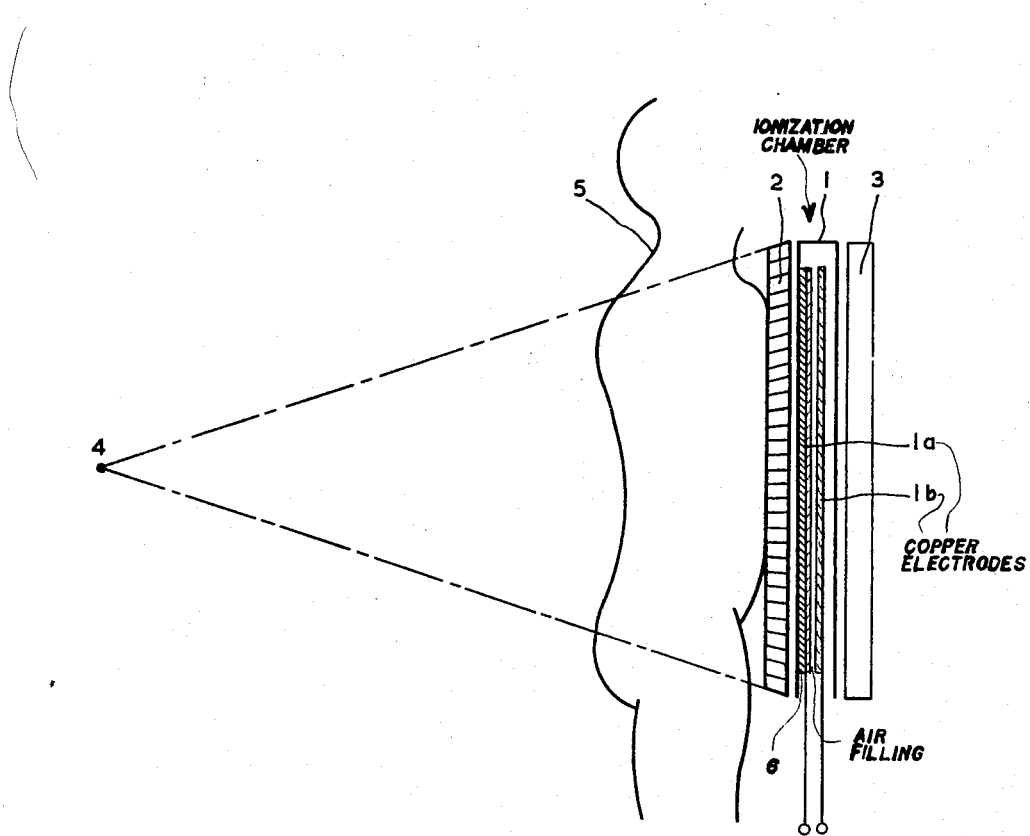
INVENTOR.
E. ZIELER
BY
AGENT

2,953,702
IONISATION CHAMBER FOR RADIATION MEASUREMENTS

Erich Zieler, Hamburg-Fuhlsbuttel, Germany, assignor, by mesne assignments, to North American Philips Company, Inc., New York, N.Y., a corporation of Delaware Filed Dec. 1, 1955, Ser. No. 550,449

Claims priority, application Germany Dec. 1, 1954

4 Claims. (Cl. 313—93)

The invention relates to ionisation chambers used for measuring X-rays. In such measuring chambers, the X-ray energy is converted by ionisation into an electric charge, while certain properties of ionisable gases and of the material from which the walls or the electrodes of the ionisation chamber are made are utilized to achieve optimum conversion. It has been common practice to use air at atmospheric pressure as the ionisable gas, the wall material usually consisting of substances of such nature that their contribution to the ionisation, due to the electrons which are emitted on irradiation, is substantially equal to the contribution of the radiation absorbed in the air filling. These materials are usually referred to as "air-equivalent materials." Instead of such a choice of the wall material, which ensures that the measuring result is only slightly dependent upon the hardness of the rays, the use of materials of higher atomic number permits of achieving that the sensitivity of an ionisation chamber depends upon the hardness of the radiation substantially in the same manner as the sensitivity of a photographic film for making X-ray exposures. This property is of importance for ionisation chambers which are used in apparatus for automatically determining the exposure time in X-ray apparatus for diagnostics. As the wall material or as the wall lining, metals are used having an atomic number which is higher than that of the so-called air-equivalent substances in order to produce ionisation chambers which have higher sensitivity to radiation of a specified hardness. Instead of air, use may be made of gases of different composition.

The ionisation current produced by the X-rays is generally proportional to the density of the gas with which the ionisation chamber is filled. Owing to atmospheric pressure variations, the density of the gas is not always the same. In addition, deformations of the walls may affect this density and may also cause the electrode spacing to change. It is an object of the invention to reduce the detrimental action of these inevitable disadvantages upon the sensitivity of the ionisation chamber to a minimum. According to the invention, the depth of the ionisation chamber is so chosen that the contribution to the ionisation in the gas produced by the radiation is small as compared with the contribution thereto of the electrons emitted from the wall material or from the electrodes owing to the radiation. This result is accomplished by choosing, as a wall material, a material having a high atomic number so that the absorption of the incident radiation in the wall relative to the gas is improved, and by adjusting the depth of the chamber so that the production of ions is made substantially independent of the gas density. The ionisation current produced irrespective of the density of the gas might also be obtained by hermetically sealing the ionisation chamber; however, the manufacture of such a measuring chamber is comparatively complicated. In addition, the difficulties of manufacture increase with increase of the gas volume enclosed and also when the walls of the chamber must be very thin for other reasons, for example, when the absorption must be small. This may be the case when the measuring chamber is arranged in close proximity to the source of radiation in the operative beam of X-rays. In the gas-tight chamber it is essential that the volume remains constant.

The difference between the direct ionisation of the gas by the X-rays and the ionisation produced by the electrons emitted from the walls is comparatively considerable when, as a wall material, use is made of a metal of not too low an atomic number. When use is made of a metal the atomic number of which is 26 (iron) or more, for X-rays having a wave-length of about 0.1 A. the direct ionisation of the gas is negligible in practice as compared with the ionisation due to photo-emission.

The kinetic energy of the photo-electrons is smaller than the quantum energy of the X-rays by the amount of energy required to release the electrons from the material, and these electrons have a pre-determined free path length in the gas, which is substantially irrespective of the nature of the gas. When the walls of the measuring chamber are spaced apart by a distance exceeding this free path length, the photo-electrons emitted from the walls are completely decelerated in the gas volume and the number of ions produced by these electrons is independent of the density of the gas. Only the number of ions produced by absorption of X-rays in the gas volume remains dependent upon the density.

Reference is had to the accompanying drawing, which is a partly side, partly cross-sectional view of an ionisation chamber in accordance with the invention as used to measure the proper exposure time in X-ray diagnostics.

The drawing shows a flat ionisation chamber for use in an apparatus for making X-ray exposures by means of image screen photography. A non-hermetically-sealed ionisation chamber 1 is arranged between a Bucky screen 2 and a fluorescent screen 3. The focus of the X-ray tube is designated 4 and the X-rays penetrate a patient 5. The ionisation chamber contains two parallel arranged electrodes 1a and 1b which may be made of copper and which may be spaced from one another by a distance of 20 mms. In this event, the direct ionisation in the gas is less than 20% of the total amount of ions produced in the gas by irradiation with X-rays of 70 kv. which pass through a filter 6 of 10 mms. of aluminum. When the density of the gas filling, which in the case shown is air, changes by 10%, the variations of the total ionisation current is less than 2%.

What is claimed is:

1. An X-ray measuring ionization chamber comprising spaced electrodes and a non-hermetically-sealed enclosure having wall portions exposed to and defining an ionization space containing air at atmospheric pressure and subject to variations in its density and ionizable by said X-rays, said wall portions being constituted of a material whose atomic number is at least 26 and thus substantially higher than air-equivalent materials, said wall portions thus providing electrons in the ionization space when excited by incident X-radiation to a substantially greater extent than that provided by the air, the spacing between the electrodes being not less than the mean free path of said electrons in said air.

2. An ionization chamber as set forth in claim 1 wherein the wall portions are of copper and constitute the said electrodes.

3. An ionization chamber for measuring X-radiation with a wavelength of about 0.1 Angstroms, comprising spaced, parallel, copper electrodes defining an ionization space containing air at atmospheric pressure and subject to density variations, the spacing between the electrodes being not less than the mean free path of electrons in said air.

4. An ionization chamber as set forth in claim 3 wherein the spacing between the electrodes is about 20 mm.

References Cited in the file of this patent

UNITED STATES PATENTS

| | | |
|---|---|---|
| 1,917,108 | Franke | July 4, 1933 |
| 2,032,137 | Lubcke | Feb. 25, 1936 |
| 2,596,080 | Raper et al. | May 6, 1952 |
| 2,679,609 | Meloy | May 25, 1954 |

OTHER REFERENCES

Proceedings of the I.R.E. Waves and Electrons Section, vol. 37, No. 7, July 1949, Geiger Counter Tubes by Friedman.

Theory and Operation of Geiger-Muller Counters—II, by Sanborn C. Brown, Nucleonics, August 1948, pages 50 to 64.